(12) United States Patent
McLean et al.

(10) Patent No.: US 6,544,681 B2
(45) Date of Patent: Apr. 8, 2003

(54) CORRUGATED FLOW FIELD PLATE ASSEMBLY FOR A FUEL CELL

(75) Inventors: Gerard F. McLean, Victoria (CA); Nedjib Djilali, Victoria (CA); Christopher E. J. Reid, Victoria (CA); Jeremy Lindstrom, Victoria (CA); Walter Roberto Mérida Donis, Victoria (CA)

(73) Assignee: Ballard Power Systems, Inc., Burnaby (CA)

( * ) Notice: Subject to any disclaimer, the term of this patent is extended or adjusted under 35 U.S.C. 154(b) by 85 days.

(21) Appl. No.: 09/749,489

(22) Filed: Dec. 26, 2000

(65) Prior Publication Data

US 2002/0081477 A1 Jun. 27, 2002

(51) Int. Cl.[7] .................. H01M 8/10; H01M 2/14; H01M 4/86; H01M 4/90; H01M 4/96
(52) U.S. Cl. .................. 429/39; 429/30; 429/38; 429/40
(58) Field of Search .................. 429/30, 38, 39, 429/40

(56) References Cited

U.S. PATENT DOCUMENTS

| | | | | |
|---|---|---|---|---|
| 4,629,537 A | | 12/1986 | Hsu .................. | 204/15 |
| 4,755,272 A | | 7/1988 | Plowman .................. | 204/256 |
| 4,988,583 A | | 1/1991 | Watkins et al. .................. | 429/30 |
| 5,108,849 A | | 4/1992 | Watkins et al. .................. | 429/30 |
| 5,521,018 A | | 5/1996 | Wilkinson et al. .................. | 42/26 |
| 5,643,690 A | | 7/1997 | Tateishi et al. .................. | 429/34 |
| 5,683,828 A | | 11/1997 | Spear et al. .................. | 429/13 |
| 5,858,567 A | | 1/1999 | Spear et al. .................. | 429/12 |
| 5,863,671 A | | 1/1999 | Spear et al. .................. | 429/12 |
| 5,868,912 A | * | 2/1999 | Reichert et al. .................. | 204/252 |
| 5,906,898 A | * | 5/1999 | Pondo .................. | 429/34 |
| 5,981,098 A | * | 11/1999 | Vitale .................. | 429/34 |
| 6,025,084 A | * | 2/2000 | Kawasaki et al. .................. | 429/30 |
| 6,071,635 A | * | 6/2000 | Carlstrom, Jr. .................. | 427/115 |
| 6,255,012 B1 | * | 7/2001 | Wilson et al. .................. | 429/12 |
| 6,284,399 B1 | * | 9/2001 | Oko et al. .................. | 429/13 |
| 6,296,964 B1 | * | 10/2001 | Ren et al. .................. | 429/38 |
| 6,383,677 B1 | * | 5/2002 | Allen .................. | 429/12 |

FOREIGN PATENT DOCUMENTS

| | | |
|---|---|---|
| JP | 7-254424 | 10/1965 |
| JP | 59-217955 | 12/1984 |
| JP | 61-128469 | 6/1986 |
| JP | 61-216257 | 9/1986 |
| JP | 61-239568 | 10/1986 |
| JP | 62-10868 | 1/1987 |
| JP | 62-47968 | 3/1987 |
| JP | 63-53858 | 3/1988 |
| JP | 2-96655 | 4/1990 |
| JP | 3-105863 | 5/1991 |
| JP | 6-68887 | 3/1994 |
| JP | 9-63599 | 3/1997 |
| JP | 9-63601 | 3/1997 |
| JP | 10-228914 | 8/1998 |
| WO | WO 98/10477 | 3/1998 |

* cited by examiner

*Primary Examiner*—Carol Chaney
*Assistant Examiner*—Donald V. Scaltrito
(74) *Attorney, Agent, or Firm*—McAndrews, Held & Malloy, Ltd.

(57) ABSTRACT

Corrugated flow field plates for use in fuel cells typically comprise a plurality of parallel open-faced fluid flow channels for the fuel cell reactants. Complex flow paths, such as serpentine flow paths, may be created in such corrugated flow field plates by incorporating channel couplings within the plate or by attaching coupling subassemblies to the plate. The plates are particularly suitable for use in solid polymer electrolyte fuel cells.

18 Claims, 8 Drawing Sheets

CORRUGATED FLOW FIELD PLATE ASSEMBLY FOR A FUEL CELL

FIELD OF THE INVENTION

The present invention relates to fuel cells and particularly to solid polymer electrolyte fuel cells incorporating a proton exchange membrane. More particularly, the present invention relates to a corrugated flow field plate assembly for a fuel cell and a means for interconnecting fluid flow channels therein.

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Conventional proton exchange membrane ("PEM") fuel cells generally employ a planar, layered structure known as a membrane, electrode assembly ("MEA"), comprising a solid polymer electrolyte or ion exchange membrane, which is neither electrically conductive nor porous, disposed between an anode electrode layer and a cathode electrode layer. The electrode layers are typically comprised of porous, electrically conductive sheets with electrocatalyst particles at each membrane-electrode interface to promote the desired electrochemical reaction.

In conventional fuel cells, the MEA is interposed between two rigid, planar, substantially fluid-impermeable, electrically conductive plates, commonly referred to as separator plates. The plate in contact with the anode electrode layer is referred to as the anode plate and the plate in contact with the cathode electrode layer is referred to as the cathode plate. The separator plates (1) serve as current collectors, (2) provide structural support for the MEA, and (3) typically provide reactant channels for directing the fuel and oxidant to the anode and cathode electrode layers, respectively, and for removing products, such as water, formed during operation of the fuel cell. Fuel channels and oxidant channels are typically formed in the separator plates, and such plates are then normally referred to as fluid flow field plates. Herein, "fluid" shall include both gases and liquids; although the reactants are frequently gaseous and the products may be liquids or liquid droplets as well as gases.

During operation of the fuel cell, hydrogen from a fuel gas stream moves from fuel channels through the porous anode electrode material and is oxidized at the anode electrocatalyst to yield electrons to the anode plate and hydrogen ions which migrate through the electrolyte membrane. At the same time, oxygen from an oxygen-containing gas stream moves from oxidant channels through the porous electrode material to combine with the hydrogen ions that have migrated through the electrolyte membrane and electrons from the cathode plate to form water. A useful current of electrons travels from the anode plate through an external circuit to the cathode plate to provide electrons for the reaction occurring at the cathode electrocatalyst.

Multiple unitary fuel cells can be stacked together to form a conventional fuel cell stack to increase the overall power output. Stacking is typically accomplished by the use of electrically conductive bipolar plates, which act both as the anode separator plate of one fuel cell and as the cathode separator plate of the next fuel cell in the stack. One side of the bipolar plate acts as an anode separator plate for one fuel cell, while the other side of the bipolar plate acts as a cathode separator plate for the next fuel cell in the stack. The bipolar plates combine the functions of anode and cathode plates referred to above and are provided with fuel channels and oxidant channels.

Fluid reactant streams are typically supplied to channels in the flow field plates via external inlet manifolds connected to the sides of the stack or by internal inlet manifolds formed by aligning openings formed in the bipolar plates and each MEA in the stack dimension. Similarly, fluid stream exhaust manifolds may be external or internal exhaust manifolds. Typically the stack also has coolant passageways extending through the bipolar plates and each MEA for circulating a coolant fluid to absorb heat generated by the fuel cell reaction.

A typical conventional bipolar flow field plate has a plurality of parallel open-faced oxidant channels on one side and a plurality of parallel open-faced fuel channels on the other side. The oxidant channels extend between an oxidant inlet manifold opening and an oxidant outlet manifold opening in the bipolar plate and typically traverse the central area of one plate surface in a plurality of passes, that is, in a serpentine manner, between the inlet manifold opening and the outlet manifold opening. Similarly, the fuel channels extend between a fuel inlet manifold opening and a fuel outlet manifold opening in the bipolar flow field plate and traverse the central area of the other plate surface in a similar plurality of passes between the fuel inlet manifold opening and the fuel outlet manifold opening.

The design of the fluid flow channel patterns is important for correct and efficient fuel cell operation. The flow channels should be sized correctly to provide the reactant species to the MEA layer, and the flow path should provide sufficient pressure drop for the flow velocities to be maintained in operation. It is desirable to be able to create flow fields with substantially different geometries on either side of the bipolar flow field plate. While serpentine channel patterns are a preferred design, channel patterns other than serpentine may be used.

The MEA is physically supported in a conventional fuel cell stack, as it is exposed to the compression forces to prevent fluid leaks between adjacent fluid flow channels in the fuel cell stack. In conventional fuel cell designs such leakage is undesirable, particularly if the channels are serpentine, as some of the fluid may move directly from the inlet manifold opening across the channels to the outlet manifold opening without passing through the passes of the channels and so missing most of the MEA. To prevent such fluid movement, flow field plates with extremely flat surfaces are required in conventional fuel cell stacks, necessitating either the grinding of the surfaces of the flow field plates or the use of molds to form the flow field plates to exacting specific tolerances.

Watkins et al. U.S. Pat. Nos. 4,988,583 and 5,108,849, issued Jan. 29, 1991 and Apr. 28, 1992, respectively, describe fluid flow field plates in which continuous open-faced fluid flow channels formed in the surface of the plate traverse the central area of the plate surface in a plurality of passes, that is, in a serpentine manner, between an inlet manifold opening and an outlet manifold opening formed in the plate.

A conventional bipolar plate is fabricated from bulk materials such as graphite and formed by creating a substantially flat plate of a given thickness and then removing materials to form flow channels in the plate. Alternately, the plate can be molded or built-up by depositing layers of materials onto a planar substrate until the desired flow channels are created. Generally, however, the manufacture of the bipolar plate remains a difficult and somewhat expensive process.

Bipolar plates manufactured according to conventional means should be made thick enough to withstand the rigors of manufacturing and be rigid enough to support the large clamping forces exercised during stack operation. This typically requires the plate to be thick enough to accommodate the full depth of the flow channels on both sides of the plate, as well as to provide a sufficiently thick solid portion in between the flow channels. This in turn means that bipolar plate design usually involves a trade-off between preferred dimensions for fuel cell operation and feasible dimensions for structural strength and cost-effective manufacturing.

It would be desirable to fabricate bipolar flow field plates for use in fuel cell stacks using low cost materials and simple manufacturing techniques that do not rely on precise machining of components. Furthermore, it would be desirable to reduce the volume of bulk material used in the formation of a bipolar flow field plate to reduce the weight and thickness of the plate, thereby improving the power density of the resulting fuel cell stack.

The use of metals for the fabrication of bipolar plates has generated considerable interest in the fuel cell design community. Metallic plates offer advantages in terms of their relative strength, high electrical conductivity and the possibility of forming shapes from thin sheets rather than hogging out thick plates or otherwise molding bulk materials. The use of metals is known to be problematic in PEM type fuel cells, however, due to corrosion and catalyst/membrane poisoning. However, the use of stainless steel 316L has resulted in moderate cell life and forms of metal coatings promise to alleviate these concerns.

Corrugated metal bipolar flow field plates have been used in molten carbonate fuel cells (MCFCs). Published Japanese Patent Publication Nos. 02-096655, 62-047968 and 59-217955 are typical examples which are constructed as a composite of two or more metallic structures formed from flat sheet materials. These designs exploit the use of multiple metallic plates formed from thin sheets and are bonded together to form an overall composite bipolar flow field plate, often with secondary channels and interstices for the storage of catalyst or other materials beneficial to the operation of molten carbonate fuel cells.

Metal bipolar flow field plates have been proposed for use in PEM type fuel cells for example, as described in U.S. Pat. Nos. 5,683,828 and 5,643,690, and Japanese Patent Publication No. 09-063601. As with their MCFC counterparts, these plates are constructed from multiple (usually at least three) individually formed plates which are subsequently bonded together to form the required flow channels.

Plates in which a single thin sheet is formed into a bipolar flow field plate are described in Japanese Patent Publication Nos. 61-128469 and 09-063599, and U.S. Pat. No. 4,755,272. These designs are advantageous in their use of simply formed corrugated metallic structures. However, these designs provide anode and cathode side flow fields that are mirror images of one another, generally with highly parallel multiple flow-paths extending from inlet to outlet plenums.

SUMMARY OF THE INVENTION

An improved flow field plate assembly supplies a reactant fluid to an electrode in a fuel cell. The assembly is suitable for use in a PEM type fuel cell stack having a series of alternating separator plate assemblies and MEA layers stacked in a stack dimension. The major components of the flow field plate assembly are: a corrugated flow field plate having corrugations that form, on each surface of the flow field plate, a plurality of open-faced fluid flow channels and a plurality of lands alternating with and parallel to the fluid flow channels; and a plurality of fluid flow couplings located in the vicinity of at least one end of the fluid flow channels for coupling a pair of adjacent flow channels on one surface of the flow field plate for flow of a first fluid between the two channels. Each coupling has a depth less than the thickness of the flow field plate such that the coupling couples flow channels on one surface of the flow field plate, yet allows a second fluid to flow by the coupling through a flow channel on the other surface of the flow field plate.

Fluids (for example, reactant or coolant) may be supplied to and removed from the flow field plate assembly by way of orifices spaced around the edges of the flow field plate. The orifices may align with orifices in an MEA layer and other flow field plate assemblies to form part of an internal manifold system of an assembled fuel cell stack.

In an assembled fuel cell stack, reactant fluids may flow on each side of the flow field plate assembly through respective flow field patterns formed by the combination of the couplings and flow channels. Oxidant flowing on one side of the flow field plate will react with fuel flowing through the MEA from the flow field of a flow field plate assembly contacting the other side of the MEA, in an electrochemical reaction that generates electricity, heat, and by-product water.

A corrugated flow field plate may be simply formed by bending a flat sheet to form channels in for example, a square wave profile; the corrugated shape may also be formed by casting, extrusion, or less preferably, by machining. Referring to one side of a corrugated flow field plate (first side), a square wave shape may form a series of parallel flow channels alternating with land surfaces in a dimension transverse to the flow channel dimension. The lands provide surfaces that physically and electrically contact an adjacent MEA. Directly opposite each land on the first side of the corrugated plate is a corresponding flow channel on the opposite side of the corrugated plate (second side), and directly opposite each flow channel on the first side of the corrugated plate is a corresponding land on the opposite second side. Thus, a first reactant fluid, for example fuel, flowing on one side of the corrugated plate is separated from a second reactant fluid, for example oxidant, flowing on the opposite side of the corrugated plate. This corrugated design tends to result in plates that are thinner than conventional bipolar flow field plates that have flow channels on one surface of the plate that do not overlap in the stack dimension with flow channels on the opposite surface of the plate. In the present approach, the flow channels on opposite sides of the corrugated layer are "co-planar" in the sense that the flow channels on the first and second surfaces are not in distinct layers, but instead overlap in the stack dimension at least to some degree.

The flow channels in a corrugated plate are not limited to a square wave cross-sectional shape. Also, different aspect ratios between the land and channel widths may be provided that result in larger cross-sectional channel areas on one side of the corrugated plate than the other.

In one aspect of the present corrugated flow field plate assembly, the flow channel couplings are integrally formed on the surface of the corrugated flow field plate as a depression of a portion of a land. By depressing the land to, say 50% of the channel height, fluid flowing in one channel adjacent the land will flow into the other channel adjacent the land. Depending on the layout of the couplings, a variety of flow field patterns can be created.

The depression of a land on a first surface of the corrugated plate of a certain depth will cause a corresponding embossment of the channel floor on the side directly opposite the depressed land portion. The magnitude of the depressions and embossments may be selected to reduce the interruption of fluid flow through the affected channels. This enables the creation of a flow field pattern on one surface of the corrugated plate in relative independence from a flow field pattern on the opposite surface of the corrugated plate.

For couplings formed as depressions in the lands that are inset from the ends of the corrugated plate, gaskets may be provided at the ends of the corrugated plate to seal the ends of the flow channels; the gaskets are preferably formed on or are an integral part of one of two gasket layers. Gasket layers sandwich the corrugated plate such that the gaskets fit into the ends of the flow channels. The gasket layers are also provided with cut outs to provide openings for the electrochemically active area of the fuel cell, and for the respective reactant supply and discharge manifolds.

In another aspect of the present corrugated flow field plate assembly, the flow couplings are not integrally formed on the corrugated plate, but are instead separate coupling subassemblies that attach to the ends of the corrugated plate. Each coupling subassembly has at least one coupling channel that connects the ends of two or more flow channel ends on one surface of the corrugated plate together in fluid communication. The coupling subassembly may comprise a pair of coupling structures that are adapted to nest with one another in the stack dimension such that for each nested pair of coupling structures, one coupling structure connects flow channels on one surface of the corrugated plate together in fluid communication, and the other coupling structure connects flow channels on the opposite second surface of the corrugated plate together in fluid communication. Preferably, a coupling subassembly is designed such that its thickness does not exceed the thickness of the corrugated flow field plate.

Like couplings that are integrally formed into the corrugated plate surface, the coupling subassemblies may be selectively located along each corrugated plate end to create a variety of flow field patterns. The selective nesting of coupling structures may also enable the independent formation of flow field patterns on each surface of the corrugated plate. This flexibility allows a designer to select different preferred flow field patterns for fuel and oxidant flows; for example, a single serpentine flow path may be formed on one side for high pressure drop operation typically desirable for oxidant flow while multiple flow paths may be formed on the other side to provide a lower pressure drop operation typically desirable for fuel flow.

As discussed above, the flow field plate assembly is advantageously relatively simple to manufacture, is readily formable with a variety of different flow field patterns on both sides of the assembly, and tends to be thinner than conventional flow field plates having comparable flow channel dimensions.

DETAILED DESCRIPTION OF PREFERRED EMBODIMENT(S)

Figure 1:
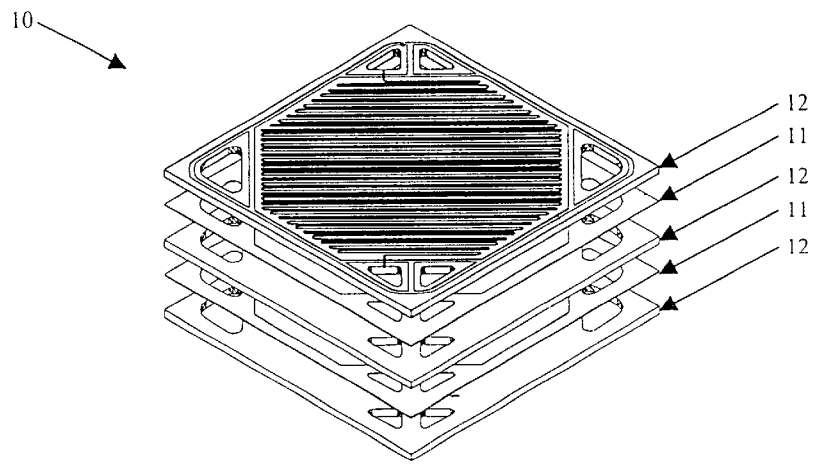
FIG. 1 is an exploded orthographic projection of the major components of a conventional PEM fuel cell stack (prior art).
Figure 2:
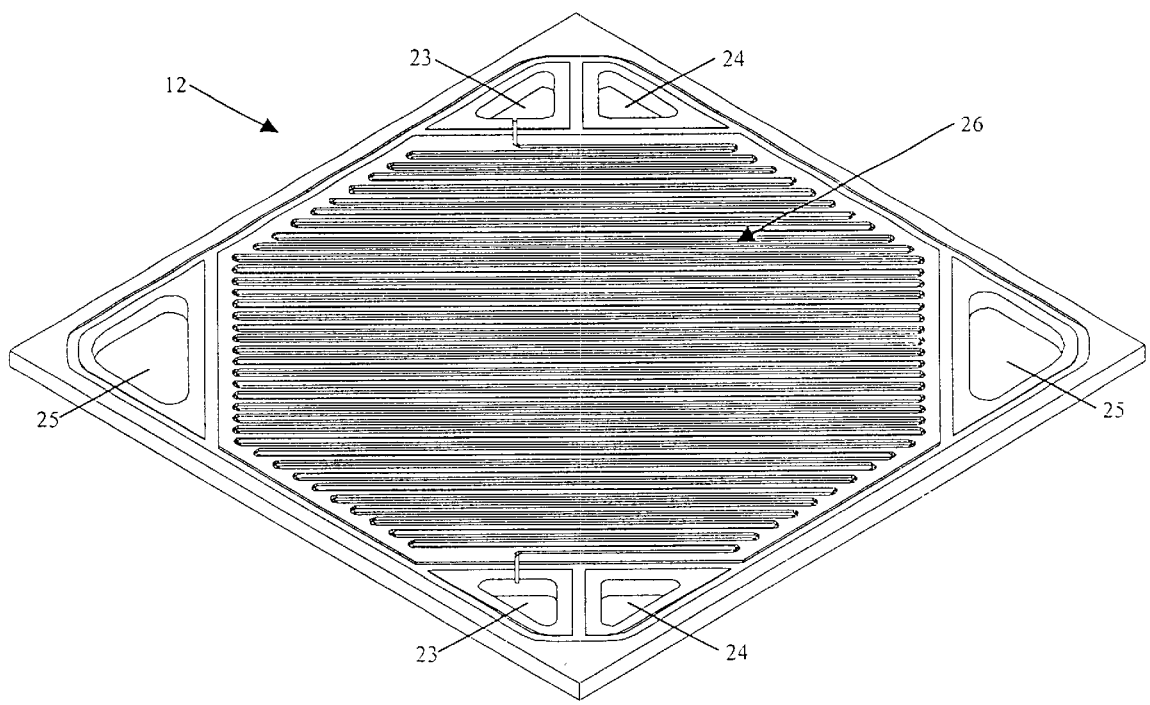
FIG. 2 is an orthographic projection of a conventional bipolar flow field plate used in the fuel cell stack illustrated in FIG. 1 (prior art).

Referring first to FIGS. 1 and 2, a conventional fuel cell stack 10 comprises multiple membrane electrode assemblies (MEA) 11 separated by bipolar flow field separator plates 12. Flow field plates 12 serve to distribute fuel and oxidant gases to neighboring MEAs as well as to provide a series electrical connection between each MEA. Each plate 12 is typically made of graphite material and has means for distributing reactant gases to a desired side of the plate and for sealing the plate/MEA interface against gas leaks. The plate 12 typically has a plurality of inlet and outlet fuel plenums 23, inlet and outlet oxidant plenums 24, coolant flow plenums 25 (optional), and on each side of the plate, one or more open-faced flow channels 26 that form a flow field pattern for the distribution of one of oxidant or fuel to an adjacent contacting MEA.

In order to effectively manage water produced as a by-product of the electrochemical reaction, it is desirable for the flow field plate 12 to have formed thereon a complex flow field pattern in which the path length of any flow channel from inlet to outlet plenum has a length far longer than the simple straight line distance between the inlet and outlet plenums on flow field plate 12. The combined length and turns in the resulting flow channel path serve to create a pressure drop during fuel cell operation. Because flow field plate 12 typically serves an MEA anode on one side and an MEA cathode on another side, it is desirable to produce different flow field patterns on either side of the plate. For example, the flow fields can differ in the aspect ratio of the flow channels, in the number of flow channel paths connecting the inlet and outlet plenums, or in the number of directional changes taken by each flow channel.

Figure 3:
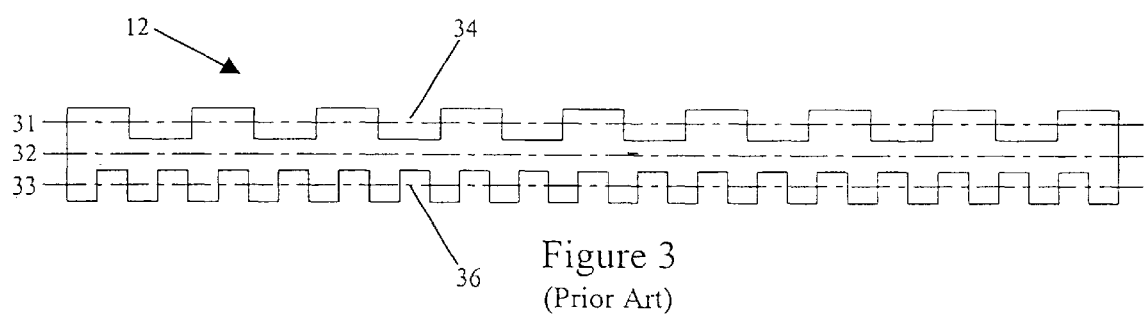
FIG. 3 is a schematic cross sectional view of a conventional bipolar plate used in a PEM fuel cell stack (prior art).

Referring to FIG. 3, a conventional flow field plate 12 may be conceptualized as having three basic regions, namely: a first surface layer 31 that includes flow channels 34 for fuel gas flow on one side of plate 30; a second surface layer 33 that includes flow channels 36 for oxidant gas flows on the opposite side of plate 12; a middle separator layer 32 that is impervious to gas flow and provides a physical separation between the oxidant and fuel gas flows as well as provides an electrical conductive bridge between the two surfaces of the plate. Since the oxidant and fuel flow channels 34, 36 are separated by the middle separator layer 32 such that there is no overlap of the channels 34, 36 in the stack dimension, the flow field pattern for each surface may be selected independently of the other, that is, the selection of one flow field pattern does not affect the selection of the other flow field pattern on the opposite side of plate 12. This enables preferred oxidant and fuel flow field patterns to be selected for flow field plate 12. However, a negative consequence of such a design is a rather thick flow field plate 12; and because stack thickness is a factor in power density, it is desirable to minimize stack thickness.

As illustrated in FIGS. 4–14, the present thin bipolar flow field separator plate assembly 100 facilitates a more independent selection of oxidant and fuel flow field patterns on either side of flow field plate assembly 100. Flow field plate assembly 100 has a corrugated plate 102 of conductive material; the corrugations form a series of parallel straight flow channels 110 on each side of corrugated plate 102. Flow field plate assembly 100 further has a number of flow couplings 104 either attached to or integrally formed on corrugated plate 102 near the ends of flow channels 110. Each coupling 104 connects a pair of adjacent flow channels 110 in fluid communication. Depending on which channels 110 are coupled, different flow field patterns on each side of corrugated plate 102 can be formed.

Figure 4:
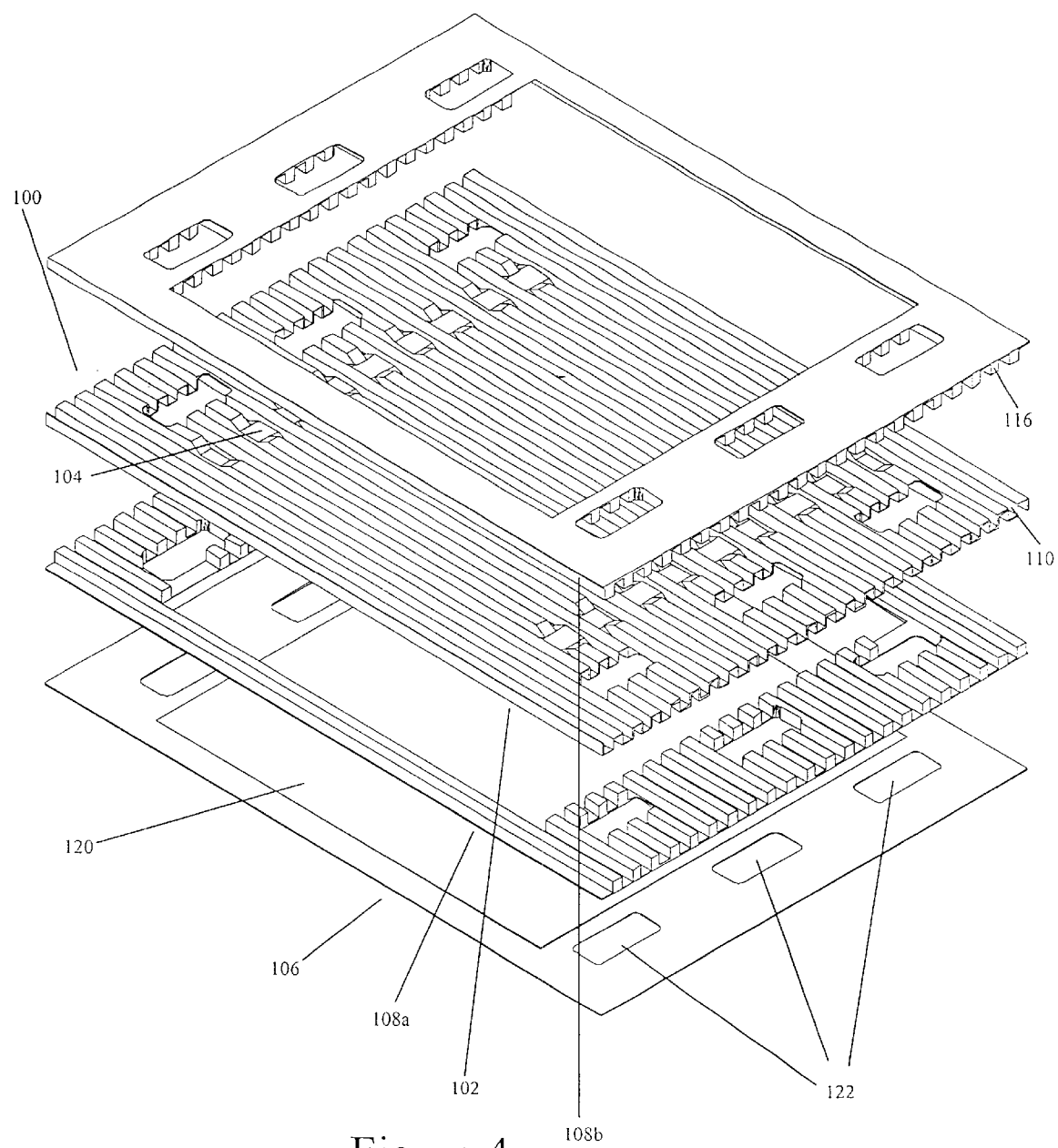
FIG. 4 is an exploded orthographic projection of an MEA gasket layer and a flow field plate assembly, according to a first embodiment of the present corrugated flow field plate assembly.

Referring to a first embodiment illustrated in FIGS. 4–10, the flow field plate assembly 100 has a plurality of flow couplings 104 integrally formed on corrugated plate 102. Referring to FIG. 4, the longitudinal (that is, parallel to the flow channel direction) ends of flow field plate assembly 100 are fluidly sealed by a pair of gasket layers 108a, 108b. The gasket layers 108a, 108b are conveniently formed from a sheet having gasket protruding from the ends of the one surface of the sheet, and cut-outs for the electrochemically active areas, and for the various plenums. Other means for providing gasket seals to the ends of flow field plate assembly 100 will readily occur to a person skilled in the relevant art and are not described further here.

Flow field plate assembly 100 can be inexpensively formed via a number of methods readily available to one skilled in the relevant art; for example, by first bending a sheet into a suitable corrugated pattern to form corrugated plate 102, then stamping selected lands 112 of corrugated plate 102 to form flow channel couplings 104. Corrugated plate 102 may also be formed by casting, extrusion, or less preferably, by conventional machining. Integrally-formed flow couplings 104 are most conveniently formed during manufacture of corrugated plate 102. This is particularly the case if corrugated plate 102 is formed by stamping, rolling or drawing a flat sheet of material to form the corrugated three dimensional structure.

The MEA 106 in FIG. 4 is formed by conventional means, having an electrochemically active area 120 and cutouts for bulk fluid manifolds 122. The first gasket layer 108a is formed using a three-dimensional casting or molding process with gaskets 116 matching the corrugations of corrugated flow field plate 102 such that a seal is formed at the flow channel ends of corrugated flow field plate 102 as discussed above and between the plate assembly 100 and MEA 106. A second gasket layer 108b, similarly formed, is laid on top of corrugated flow field plate 102 and provides a seal at the fuel flow channel ends and with another adjacent MEA (not shown) placed on top of the corrugation. By repeating this pattern a stack of fuel cells can be constructed.

Figure 5:
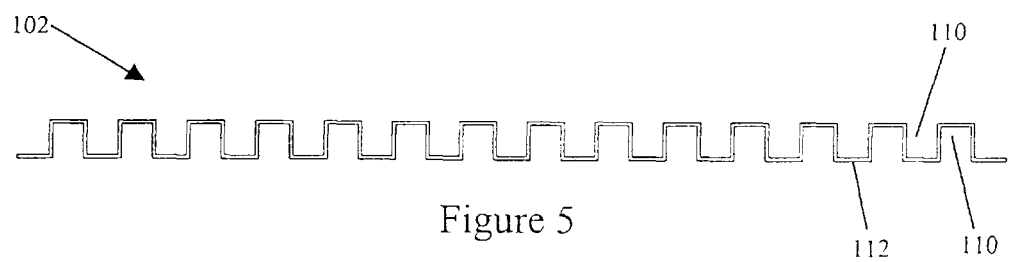
FIG. 5 is a cross sectional view of the central portion of a corrugated bipolar flow field plate with similarly dimensioned flow channels on either side of the plate.
Figure 6:
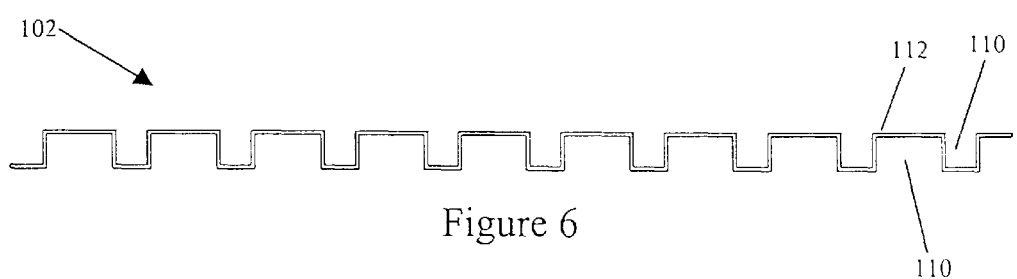
FIG. 6 is a cross sectional view of the central portion of a corrugated bipolar flow field plate with different flow channel dimensions on either side of the plate.

FIGS. 5 and 6 illustrate cross sectional views of two suitable corrugation patterns for corrugated flow field plate 102. The remaining discussion will refer to a corrugated plate having the corrugation pattern as illustrated in FIG. 5; however, it is to be understood that a designer may select different corrugation patterns than those illustrated in FIGS. 5 and 6 as circumstances dictate.

Corrugated plate 102 can be made of any material known to be suitable for fuel cell flow field separator plates. The material should be non-porous and conductive. Graphite is a preferred material for use in fuel cell flow field plates, but stainless steel or other metallic plates may also be suitable and have the advantage of being easily mechanically worked to produce the desired corrugated pattern. Certain moldable materials such as conductive plastics or carbon fiber composites may also be suitable materials for corrugated plate construction. Non-conductive materials may also be suitably used if subsequently rendered conductive by some post-manufacturing process such as metalization.

To perform the functions nominally required of a conventional bipolar plate, corrugated plate 102 is provided on each side thereof with reactant fluid flow channels 110 for one of fuel and oxidant distribution and lands 112 for contacting an adjacent MEA 106 and for collecting electrons from the surface of MEA 106. As the flow channels 110 and lands 112 are defined by the corrugations, it follows that all flow channels 110 are parallel to each other, and that fuel channels on one side of the corrugated plate 102 alternate with oxidant flow channels on the other side of the corrugated plate 102 in a dimension transverse to the flow channel dimension. It is possible to alter the ratio of land width to channel width by altering the wave shape used for this corrugated flow field plate. One such alternative wave shape is shown in FIG. 6. However, the number of flow channels 110 on the fuel and oxidant side of the plate is preferably roughly the same.

The flow field pattern for each side of flow field plate assembly 100 is dictated by the particular layout of flow couplings 104 in corrugated plate 102. In other words, the location of couplings 104 in each channel 110 and the specific channels 110 that are coupled will form a particular flow field pattern. In this embodiment, the couplings on one side of flow field plate assembly 100 are arranged to form a single serpentine flow path. The specific arrangement of couplings 104 is discussed in detail below. Generally, couplings 104 are located at each longitudinal end of corrugated plate 102, wherein couplings 104 located at one longitudinal end are transversely offset from couplings 104 at the other longitudinal end such that the interconnections between flow channels 110 and couplings 104 form a serpentine flow path.

As can be seen in FIGS. 5 and 6, the corrugated layer design enables the construction of a thinner flow field plate relative to conventional flow field plates like those illustrated in FIGS. 1 to 3. Instead of flow channels 34, 36 of the conventional separator 12 that do not overlap in the stack dimension, flow channels 110 of the corrugated plate are "co-planar" in the sense that oxidant and fuel flow channels 110 overlap each other in the stack dimension.

Figure 7:
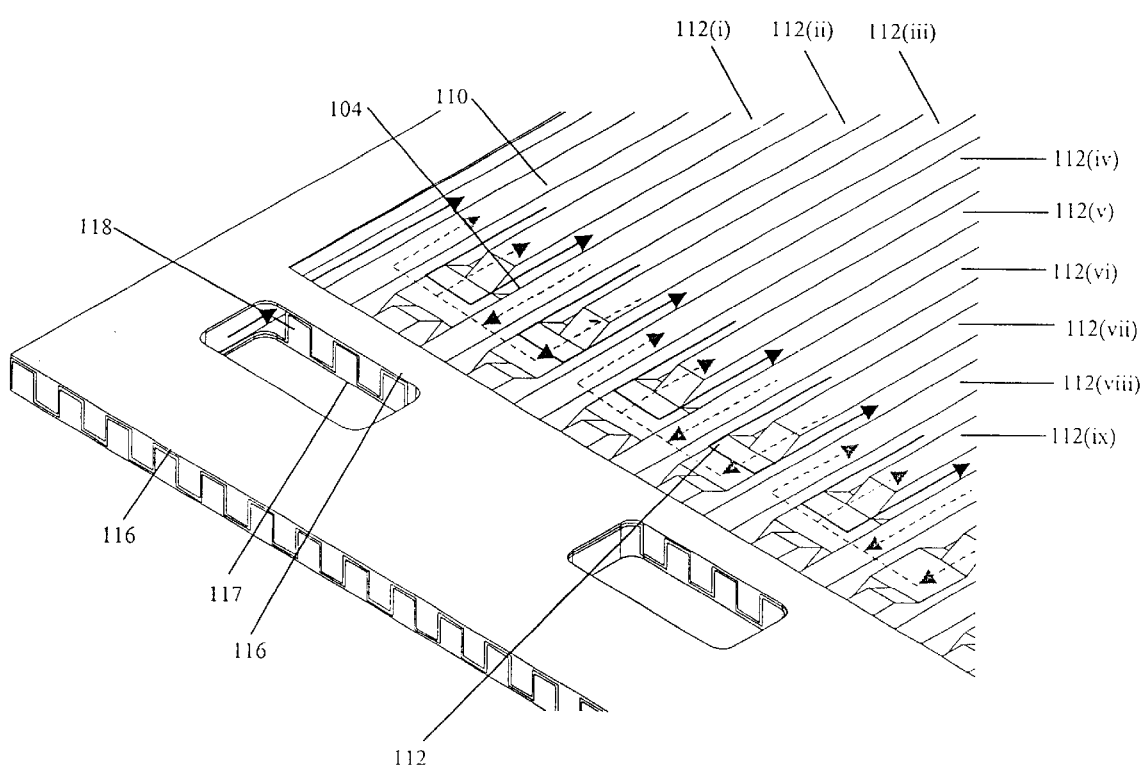
FIG. 7 is an orthographic projection of a portion of an assembled flow field plate with gaskets, illustrating in particular, a series of flow couplings.
Figure 8:
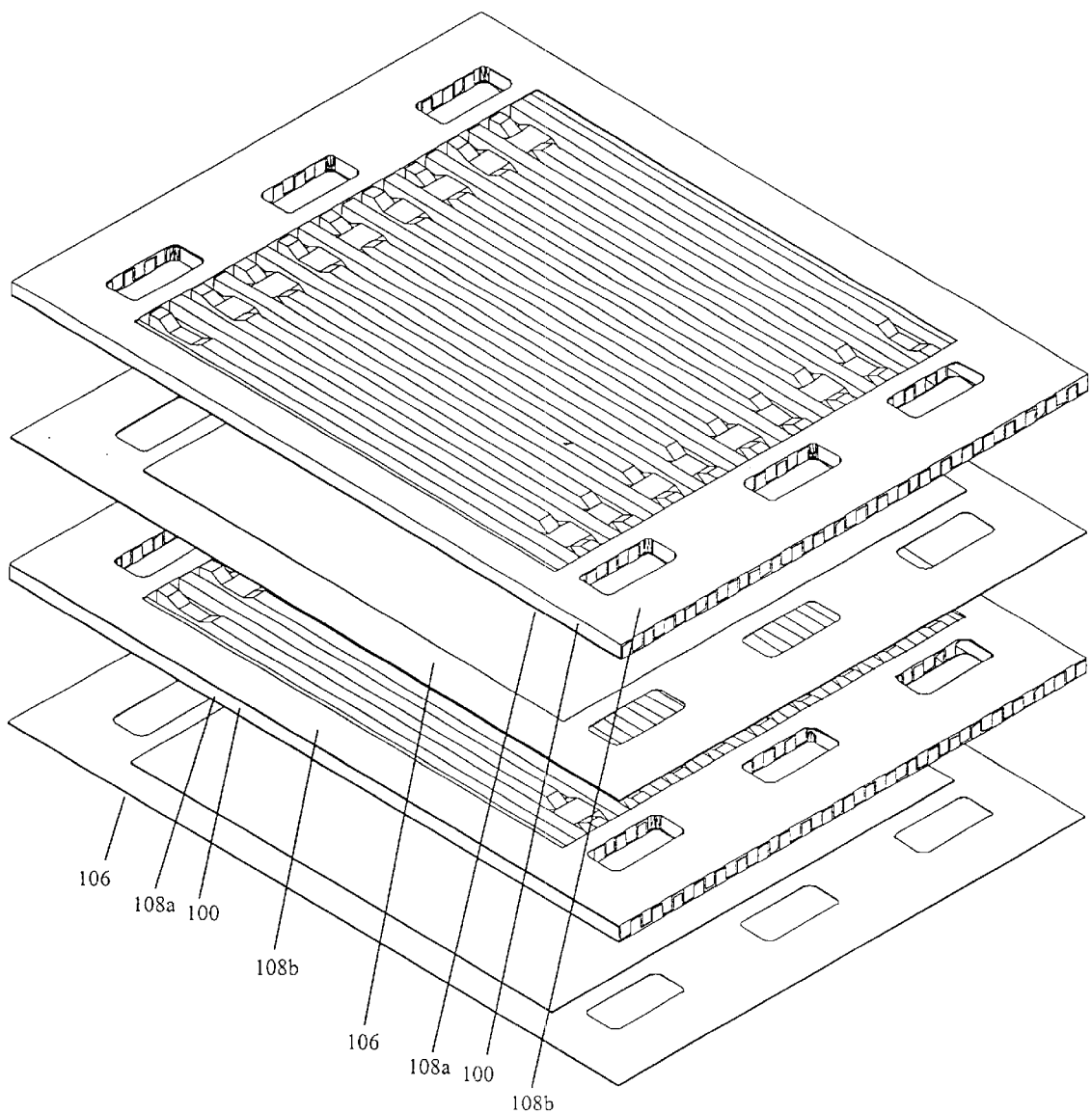
FIG. 8 is an exploded orthographic projection of a PEM fuel cell stack, having a pair of flow field plate assemblies interspersed with a pair of MEAs.

Referring to FIG. 7, oxidant is supplied to each side of plate assembly 100 via oxidant supply manifolds 117 and oxidant inlet orifice 118 and out of plate assembly 100 via oxidant discharge manifolds (not shown) and an oxidant outlet orifice (not shown). Similarly, fuel is supplied to the other side of plate assembly 100 by respective inlet and outlet manifolds (not shown) and inlet and outlet orifices (not shown). In this embodiment, oxidant inlet orifice 118 is located near one corner of the plate assembly 100 and the oxidant outlet orifice is located near the corner of plate assembly 100 diagonally opposite the inlet orifice 118. Both orifices are in fluid communication with a respective associated flow channel 110, and these flow channels 110 are coupled to other flow channels to form a flow path that enables oxidant to flow from the oxidant inlet orifice, across the electrochemically active area of flow field plate assembly 100, and out through the oxidant outlet orifice.

The path of the oxidant flow through each side of plate assembly 100 is shown by the solid arrows; the path of the fuel flow on the other side of the assembly 100 is shown by the dashed arrows. For clarity, the sealing gaskets are not shown in FIG. 7. Flow couplings 104 are formed on the oxidant flow side of assembly 100 by depressing selected lands 112(i), 112(iii), 112(v), 112(vii) and 112(ix) between the oxidant flow channels 110 to be coupled. By depressing a land 112, the floor of a fuel channel on the other side of the depressed land is raised by a corresponding amount. For each coupling 104 illustrated in FIG. 7, pairs of lands (not shown) on the fuel side of corrugated plate 102 that sandwich a depressed land on the oxidant flow side of the layer 102 are also pressed such that the floors of oxidant flow channels adjacent each depressed, land 112(i), 112(iii), 112 (v), 112(vii) and 112(ix) on the oxidant flow side are raised. As a result, a flow coupling 104 is formed that enables both oxidant to flow between adjacent oxidant channels 110, and fuel to flow between adjacent fuel channels 110 on the other side of corrugated plate 102.

At flow coupling 104, the flow channel depth is reduced for both fuel and oxidant flow channels 110, and the fuel and oxidant that flow mainly in the same plane in adjacent parallel flow channels are now forced to flow in two distinct planes, one on top of the other. Typically, the aspect ratio of the depth of coupling 104 to flow channel 110 is about 50%. This decrease in depth serves to induce a pressure drop, which is generally a desirable characteristic in fuel cell operation. Also, this aspect ratio has been found suitable to avoid interference with the reactant flow on the other side of the plate assembly 100. In other words, relatively independent control of the flow fields on opposite sides of the flow field plate can be exercised, through the selective stamping of the lands 112.

With respect to the oxidant flow field illustrated by the black arrows in FIG. 7, a serpentine flow path is formed by stamping at one longitudinal end of corrugated plate 102 every second land 112(i), 112(iii), 112(v), 112(vii) to form flow couplings between pairs of channels 110; similarly, lands 112(ii), 112(iv), 112(vi), 112(viii) are depressed at the other longitudinal end. With respect to the fuel flow field illustrated in FIG. 7, a different pattern of couplings 104 are formed to enable four channels to be connected in parallel. It can be seen that a variety of flow path patterns can be easily formed by selecting different lands to depress in both fuel and oxidant flow channels 110. For example, for oxidant flow, it is generally desirable to have a single serpentine flow path. Therefore, every alternating land 112 on the oxidant side of the plate has a depression depth about 50% of channel depth. On the fuel side, multiple neighboring lands may be depressed to provide a multiple parallel flow path for the fuel flow.

Figure 9:
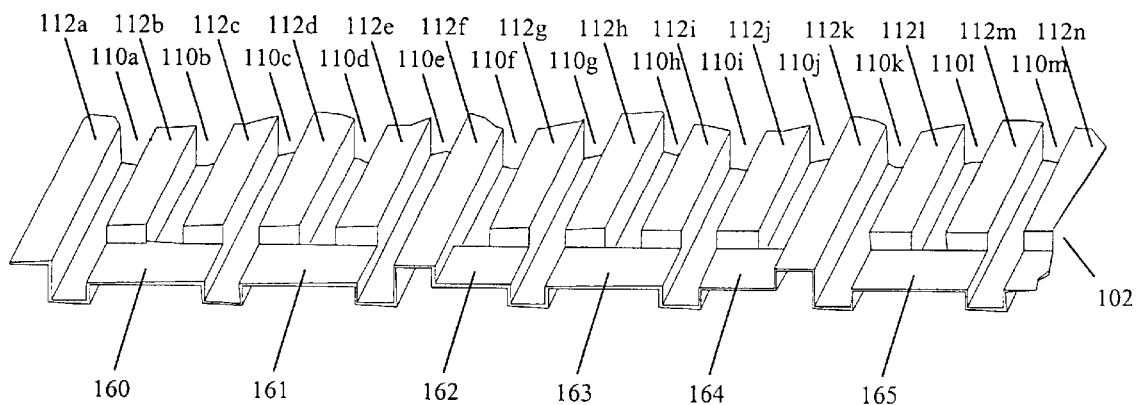
FIG. 9 is an orthographic projection illustrating a portion of a top of a region of a flow field plate comprising a plurality of couplings.
Figure 10:
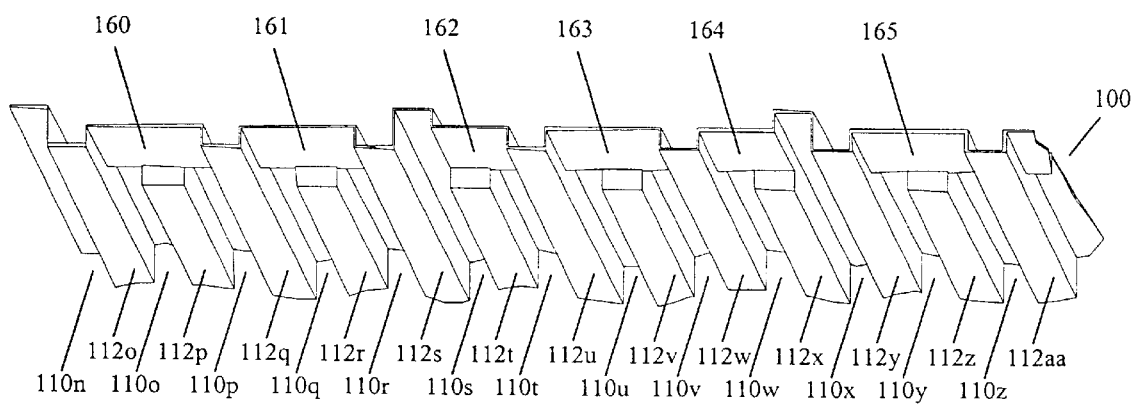
FIG. 10 is an orthographic projection illustrating a portion of a bottom of a region of a flow field plate comprising a plurality of couplings.

By selecting different flow coupling patterns, a designer can form different flow field patterns on flow field plate assembly 100. An example of such a flow coupling pattern is illustrated in FIGS. 9 and 10. An orthographic projection of a flow channel end portion of corrugated plate 102 as viewed from the fuel flow side is shown in FIG. 9. Multiple, parallel fuel flow channels 110(a)–(m) are defined by the corrugations. The floors of these flow channels form lands on the other side thereof. The flow channels 110(a)–(m) are separated by lands 112(a)–(n); on the other side of each of these lands is the floor of oxidant flow channels on the other side of corrugated plate 102. The fuel flow path is created by the selected coupling of fuel channels; for example, coupling regions 160, 161 are formed by pressing lands 112(b)–(e) to about 50% of channel depth to provide fluid communication between channels 110(a)–(e). Similarly, regions 162, 163, 164 are created to provide fluid communication between fuel channels 110(f)–(j). Since lands 112 (b)–(e) have been pressed only to the midpoint of the flow channels the flow field on the opposite of the plate has not been substantially disturbed. Land 112(f) is not pressed in order to prevent fluid communication between any of channels 110(a)–(e) and any of channels 110(f)–(j). Also, the floors of channels 110(a), 110(c), 110(e), 110(g), 110(i), 110(k), 110(m) are not raised, whereas the floors of channels 110(b), 110(d), 110(f), 110(h), 110(j), 110(l) have been raised. This alternating pattern allows neighboring pairs of channels on the oxidant side of the plate to be in gaseous communication. By selectively pressing the corrugated material to form flow couplings, it is possible to create different flow field patterns on both sides of corrugated plate 102. A similar coupling pattern may be formed at the other end of corrugated plate 102 but offset to form a serpentine flow path for the fuel to traverse.

FIG. 10 shows the portion of corrugated plate 102 illustrated in FIG. 9 from the opposite side, and shows the interconnection of the oxidant flow paths. On the other side of fuel channels 110(a)–(m) are lands 112(o)–(z) and 112(aa). Similarly, on the other side of lands 112(a)–(n) are formed oxidant channels 110(n)–(z). Lands 112(o), 112(q), 112(s), 112(u), 112(w), 112(y) and 112(aa) are not pressed and therefore extend to the end of the plate 102 while lands 112(p), 112(r), 112(t), 112(v), 112(x) and 112(z) have been pressed to form couplings 160, 161, 162, 163, 164, 165. This pattern forms coupled pairs of oxidant channels in gaseous communication, namely, flow channels 110(o) and 110(p); 110(q) and 110(r); 110(s) and 110(t); 110(u) and 110(v); 110(w) and 110(x); 110(y) and 110(z). Couplings (not shown) are formed on the other end of the corrugated plate to provide fluid communication between channels 110(p) and 110(q), 110(r) and 110(s), 110(t) and 110(u), 110(v) and 110(x); 110(y) and 11O(z) thereby creating a fuel flow field consisting of a single, serpentine flow path that traverses the entire MEA region.

It is evident from FIGS. 9 and 10 that two different flow field geometries can be readily formed in a single corrugated plate assembly 100 by selectively forming flow couplings 106 at each flow channel end of corrugated plate 102. Since forming such a corrugated plate with such couplings is relatively simple, manufacturing costs are reduced. Further, like conventional machined plates, it is possible to form complex flow field patterns in flow field plate assembly 100. Further, assembly 100 tends to be thinner than conventional flow field plates for given flow channel dimensions, due to the corrugated design and the compact coupling design. A further advantage over conventional fuel cells is that the active region of the MEA 106 may extend over the regions 160, 161, 162, 163, 164, 165 thus allowing useful current generating activity to continue in the region of internal flow redirection. In other words, the integrally formed flow couplings 104 redirect the flow while exposing the reactant fluids to the MEA active area.

As the shape of the transition from the floor of a flow channel 110 to the floor of the flow coupling 104 (typically about one-half the channel depth) can have important implications for the lifetime of the corrugated plate, the designer will take care in designing a suitable shape of the transition. For example, the stamping of flow couplings 104 in the illustrations of this first embodiment are made such that a straight ramp is formed between the channel floor and the coupling floor.

FIGS. 11–14 relate to a second embodiment of a flow field plate assembly 210. In this second embodiment, the same general principles as in the first embodiment apply: combining flow couplings and flow channels formed in a corrugated plate to create a variety of flow field patterns. The primary difference between the two embodiments is that in the second embodiment, flow couplings are separately formed subassemblies that are attached to the flow channel ends of corrugated plate 102 (in contrast to flow couplings 104 of the first embodiment, which are integrally formed on corrugated plate 102). Flow coupling structures 212, 214 as illustrated have formed thereon a plurality of flow couplings for connecting associated fuel and oxidant flow channels such that a particular flow field pattern is formed dependent on the coupling pattern. Coupling structure 212 that couples fuel flow channels does not interfere with coupling structure 214 that couples oxidant flow channels, as the two flow coupling structures 212, 214 are adapted to nest together such that the combined thickness of the nested coupling structures 212, 214 is about the same as that of corrugated plate 102. By altering the coupling pattern, either by the placement of coupling structures 212, 214 transversely across the associated end of corrugated plate 102, or by changing the coupling pattern within each coupling structure 212, 214, different flow field geometries may be formed on either side of corrugated plate 102. Flow coupling structures 212, 214 need not be conductive and could be manufactured by injection molding or vacuum forming of plastics. Also, flow coupling structures 212, 214 could be alternatively manufactured as a single structure (not shown).

Figure 11:
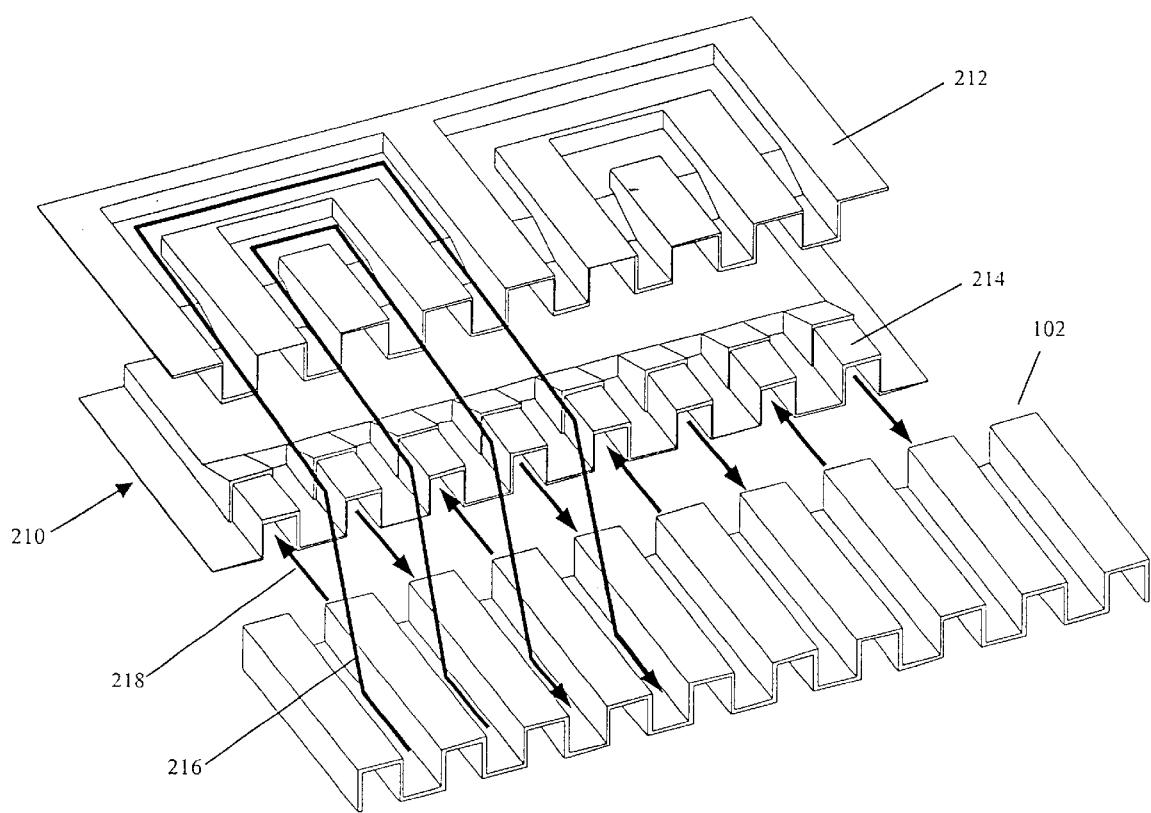
FIG. 11 is an exploded top orthographic projection of a coupling subassembly comprising separate coupling structures for attachment to a corrugated flow field plate in accordance with a second embodiment of the present corrugated flow field plate assembly.

Referring to FIG. 11, the elongate black arrows 216 illustrate the flow path of a first reactant fluid and the short arrows 218 illustrate the flow path of a second reactant fluid on the opposite side of corrugated plate 102. It can be seen that a variety of different flow field patterns may be formed by the particular layout of flow couplings in each coupling subassembly comprising flow coupling structures 212, 214.

Figure 12:
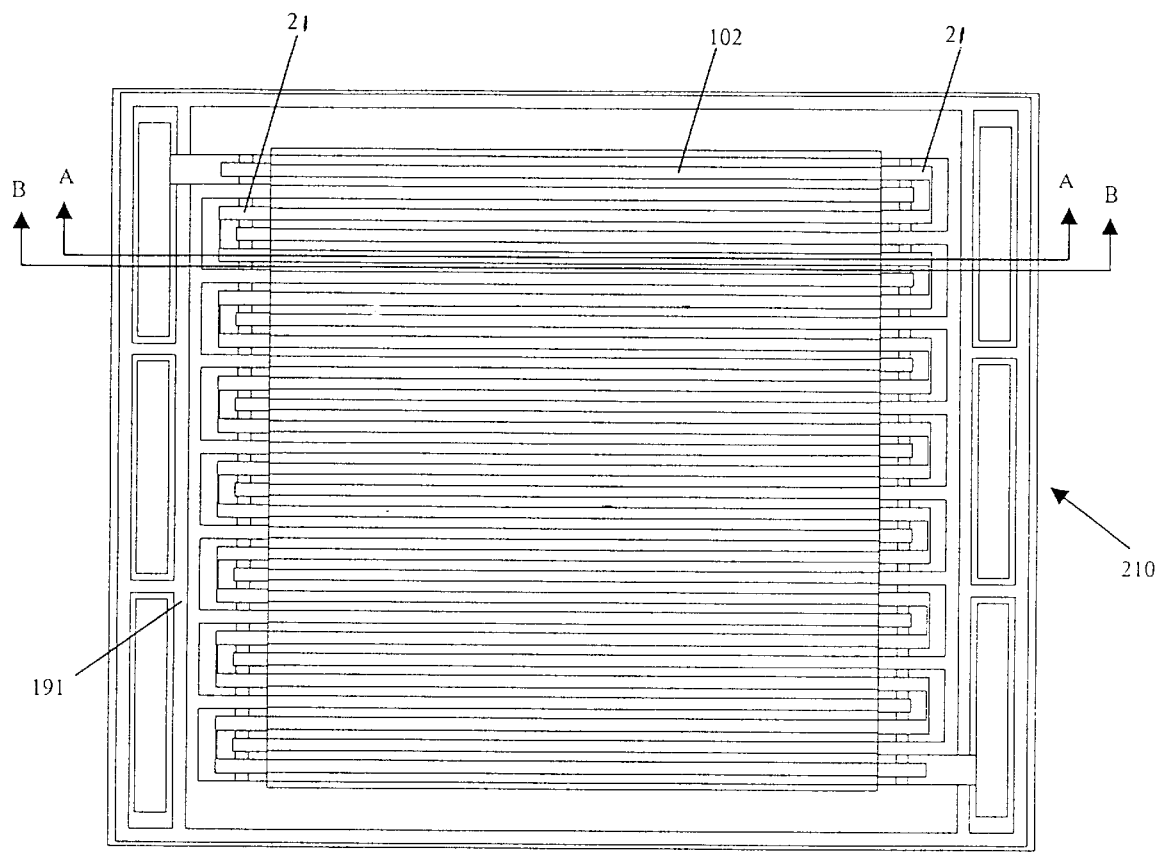
FIG. 12 is a plan view of a fuel cell flow field plate assembly comprising coupling subassemblies.

The integration of coupling structures 212, 214 into a flow field plate assembly 210 is shown in FIG. 12. A rectangular corrugated flow field plate 102 is connected at either flow channel end to coupling structures 212, 214. Note that in the plan view in FIG. 12, coupling structures 214 are hidden from view. Once assembled in a fuel cell stack, flow field plate 102 together with the coupling structures 212, 214 creates a flow field pattern on both sides of plate assembly 210

Figure 13:
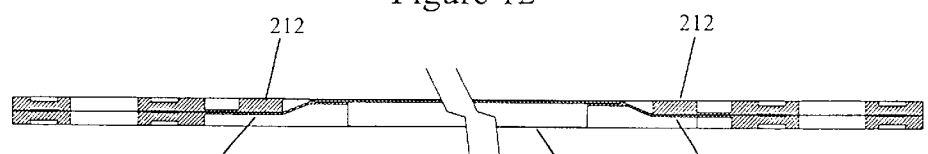
FIG. 13 is a sectional elevation view of the flow field plate assembly shown in FIG. 12 along the line A—A.
Figure 14:
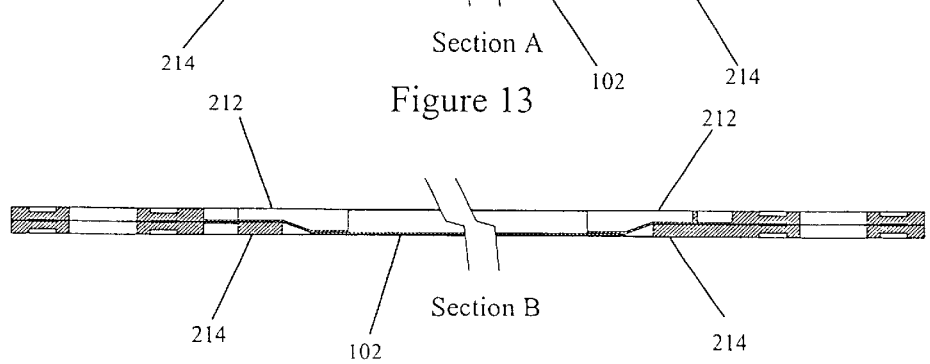
FIG. 14 is a sectional elevation view of the flow field plate assembly shown in FIG. 12 along the line B—B.

Referring to the two cross sectional views of assembly 210 taken through sections A—A and B—B in FIGS. 13 and 14, it can be seen that the nesting of flow coupling structures 212 and 214 enable the coupling subassembly comprising the coupling structures to stay flush with the surfaces of flow field plate assembly 210. Preferably, flow coupling structures 212, 214 are made of a conductive material to enable full utilization of the MEA material in adjacent contact with flow field plate assembly 210. If the flow coupling structures 212, 214 are non-conductive, then any current generated by an active MEA in these regions travels laterally across the gas diffusion electrode of the MEA to reach the conductive corrugated plate in order to drive a load. If the MEA is not active in this region, then a small portion of the cell will not be producing current thereby reducing the overall volume efficiency of the resulting fuel cell stack. If flow coupling structures 212, 214 are fabricated from conductive materials then the composite bipolar flow field plate assembly 210 provides an active area approximately equivalent to that of plate assembly 100 of the first embodiment.

Both described embodiments facilitate production of an inexpensive and low volume bipolar flow field plate suitable for use with conventional MEA technology. In addition to being relatively inexpensive to manufacture, flow field plate assemblies 100, 210 are thinner than comparable conventional flow field plates. This improves volumetric power density and possibly gravimetric power density depending upon the materials chosen to manufacture the plate.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A flow field plate assembly for supplying a reactant fluid to an electrode in a fuel cell, said assembly comprising a corrugated flow field plate in which the corrugations form a plurality of open-faced fluid flow channels and a plurality of lands alternating with and parallel to said fluid flow channels on each surface of said plate, said channels having a height that is predominantly unfilled, said plate comprising a plurality of fluid flow couplings located in the vicinity of at least one end of said fluid flow channels, each coupling having a depth less than the thickness of said plate and coupling a pair of adjacent flow channels on one surface of said plate for flow of a first fluid between said pair of channels, and allowing a second fluid to flow by said coupling through a flow channel on the other surface of said plate.

2. The assembly of claim 1 comprising a plurality of fluid flow couplings located in the vicinity of both ends of said fluid flow channels.

3. The assembly of claim 1 wherein said first and second fluids are reactant fluids.

4. The assembly of claim 1 wherein each fluid flow coupling is inset from the edge of said plate and said assembly further comprises a gasket for sealing the ends of each flow channel.

5. A flow field plate assembly for supplying a reactant fluid to an electrode in a fuel cell, said assembly comprising a corrugated flow field plate in which the corrugations form a plurality of open-faced fluid flow channels and a plurality of lands alternating with and parallel to said fluid flow channels on each surface of said plate, said plate comprising a plurality of fluid flow couplings located in the vicinity of at least one end of said fluid flow channels, each coupling having a depth less than the thickness of said plate and coupling a pair of adjacent flow channels on one surface of said plate for flow of a first fluid between said pair of channels, and allowing a second fluid to flow by said coupling through a flow channel on the other surface of said plate, wherein each fluid flow coupling comprises a depression in a portion of a land, thereby providing a fluid flow connection between the flow channels adjacent to said land.

6. The assembly of claim 5 wherein said depression in said land forms an embossment in a flow channel on the opposite side of said plate that is about one half of the depth of said embossed channel.

7. The assembly of claim 5 further comprising orifices near the edges of said plate for supply and removal of fluids.

8. The assembly of claim 1 wherein each fluid flow coupling is integrally formed in said plate.

9. A flow field plate assembly for supplying a reactant fluid to an electrode in a fuel cell, said assembly comprising a corrugated flow field plate in which the corrugations form a plurality of open-faced fluid flow channels and a plurality of lands alternating with and parallel to said fluid flow channels on each surface of said plate, said plate comprising a plurality of fluid flow couplings located in the vicinity of at least one end of said fluid flow channels, each coupling having a depth less than the thickness of said plate and coupling a pair of adjacent flow channels on one surface of said plate for flow of a first fluid between said pair of channels, and allowing a second fluid to flow by said coupling through a flow channel on the other surface of said plate, further comprising a coupling subassembly attached to said plate at the end of said flow channels wherein said coupling subassembly comprises said fluid flow couplings.

10. The assembly of claim 9 further comprising two coupling subassemblies attached to said plate at each end of said flow channels.

11. The assembly of claim 10 wherein each coupling subassembly comprises a pair of coupling structures adapted to nest with each other in a direction perpendicular to said plate such that for a nested pair of coupling structures, one of said pair fluidly connects flow channels on one surface of said plate, and the other of said pair fluidly connects flow channels on the opposite surface of said plate.

12. The assembly of claim 11 wherein the thickness of a said nested pair of coupling structures is less than the depth of said plate.

13. The assembly of claim 9 wherein the coupling subassembly is made from plastic.

14. The assembly of claim 2 wherein said plurality of fluid flow couplings is located on both surfaces of said plate and couple pairs of adjacent flow channels on both surfaces of said plate.

15. The assembly of claim 1 wherein said fuel cell is a solid polymer electrolyte fuel cell.

16. A fuel cell comprising the flow field plate assembly of claim 1.

17. A method of forming a flow field pattern in a plate assembly for supplying a reactant fluid to an electrode in a fuel cell, said assembly comprising a corrugated flow field plate in which the corrugations form a plurality of open-faced fluid flow channels and a plurality of lands alternating with and parallel to said fluid flow channels on each surface of said plate, said channels having a height that is predominantly unfilled, said method comprising the step of:

forming a plurality of fluid flow couplings in the vicinity of at least one end of said fluid flow channels such that each coupling has a depth less than the thickness of said plate and couples a pair of adjacent flow channels on one surface of said plate for flow of a first fluid between said pair of channels, and directs a second fluid to flow via said coupling to a flow channel on the other surface of said plate.

18. The method of claim 16 wherein said flow field pattern is serpentine.

\* \* \* \* \*